United States Patent
Greve

(10) Patent No.: US 9,332,769 B2
(45) Date of Patent: May 10, 2016

(54) ROLLER-TYPE PEELER WITH RETRACTABLE RACK GEAR AND ASSOCIATED METHOD

(71) Applicant: Laitram, L.L.C., Harahan, LA (US)

(72) Inventor: Christopher G. Greve, Covington, LA (US)

(73) Assignee: Laitram, L.L.C., Harahan, LA (US)

( * ) Notice: Subject to any disclaimer, the term of this patent is extended or adjusted under 35 U.S.C. 154(b) by 93 days.

(21) Appl. No.: 14/464,920

(22) Filed: Aug. 21, 2014

(65) Prior Publication Data

US 2016/0050943 A1    Feb. 25, 2016

(51) Int. Cl.
A22C 29/02    (2006.01)

(52) U.S. Cl.
CPC .................................... *A22C 29/026* (2013.01)

(58) Field of Classification Search
CPC ...... A22C 29/00; A22C 29/02; A22C 29/021; A22C 29/023; A22C 29/026
USPC .................. 452/1, 2, 5, 7, 9, 12, 19
See application file for complete search history.

(56) References Cited

U.S. PATENT DOCUMENTS

| | | | |
|---|---|---|---|
| 2,574,044 A | 11/1951 | Lapeyre et al. | |
| 2,778,055 A | 1/1957 | Lapeyre et al. | |
| 3,626,551 A | 12/1971 | Lapeyre | |
| 3,740,795 A * | 6/1973 | Cox | A22C 29/026 452/5 |
| 4,947,519 A * | 8/1990 | Griffis | A22C 29/043 452/19 |
| 5,005,258 A * | 4/1991 | Griffis | A22C 29/043 452/18 |
| 5,120,265 A * | 6/1992 | Ledet | A22C 29/026 452/2 |
| 5,980,373 A * | 11/1999 | Rosow | A22C 29/026 452/2 |
| 6,017,268 A * | 1/2000 | Rosow | A22C 29/026 452/5 |
| 6,139,415 A * | 10/2000 | Rosow | A22C 29/026 452/5 |
| 6,248,010 B1 * | 6/2001 | Sirgo | A22C 29/026 452/5 |
| 6,435,959 B1 * | 8/2002 | Skrmetta | A22C 29/00 452/5 |
| 7,811,157 B1 * | 10/2010 | Wimberly | A22C 29/026 452/5 |
| 8,616,940 B2 * | 12/2013 | Vedsted | A22B 5/166 452/5 |
| 8,870,632 B2 * | 10/2014 | Vedsted | A22B 5/166 452/5 |

* cited by examiner

*Primary Examiner* — Richard Price, Jr.
(74) *Attorney, Agent, or Firm* — James T. Cronvich

(57) ABSTRACT

A roller-type peeler having a rack gear retractable for servicing peeler rollers and a method for servicing peeler rollers by retracting the rack gear. A jack attached to the rack gear allows an operator to jack the rack gear up to a service position and out of engagement with roller gears so that the rollers can be removed and replaced and to lower the rack gear back into engagement with the gears of the replaced rollers.

19 Claims, 7 Drawing Sheets

ROLLER-TYPE PEELER WITH RETRACTABLE RACK GEAR AND ASSOCIATED METHOD

BACKGROUND

This invention relates to peeling apparatus and, more particularly, to roller-type peeling machinery having retractable rack gears.

Originally introduced because of the high labor costs of peeling small shrimp by hand, shrimp peeling machines are now widely used in the shrimp processing industry. Roller-type shrimp-peeling machines, in particular, dominate the bulk shrimp peeling industry. U.S. Pat. No. 2,778,055, Jan. 22, 1957, and U.S. Pat. No. 2,537,355, Jan. 9, 1951, both to Fernand S., James M., and Emile M. Lapeyre, describe the basic structure and principles of operation of roller-type shrimp peelers.

U.S. Pat. No. 2,778,055 shows a bulk peeling machine with a rigid framework supporting the peeling elements. A transverse beam divides the machine into two peeling sections. The upper peeling section extends from a rear wall to the beam; the lower peeling section extends from the beam to the lower front end of the machine. Shell-on shrimp are fed over the rear wall to the upper peeling section. Channels are formed in the upper peeling section by groups, or associations, of five rollers for each channel. The association of rollers includes a power roller forming the base of the channel, two channel-forming rollers flanking and spaced slightly above the power roller, and two small-diameter insert rollers between the power roller and the channel-forming rollers. The power rollers extend the full length of the machine through both the upper and lower peeling sections. The power rollers are supported in the lower peeling section by base idler rollers. All the rollers incline downwardly from the rear wall to the front end of the machine. The channel-forming rollers and the insert rollers extend only the length of the upper peeling section and are mounted at the rear wall and at the transverse beam. The power rollers and the channel-forming rollers are mounted in fixed locations so that their peripheries are separated a distance slightly less than the diameter of the insert rollers. In this way, the insert rollers, which are not fixedly mounted as are the power and channel-forming rollers, can be forcibly urged by spring pressure into the gaps between the power and channel-forming rollers. The spring pressure provides a tight nip between the insert roller and the power roller. In the lower peeling section, two power rollers and a base idler roller at a lower elevation form an inverted triangular lower peeling channel. The power rollers rotate the base idler roller by frictional contact. The power rollers rotate in alternate directions to force shrimp in the upper peeling section into the nips on one side of the channel and then into the nips on the other side of the channel. The shrimp are unwrapped of their shells in the nips, the shells falling as waste through the gaps between the power roller and the channel-forming rollers. Most of the peeling is effected in the upper peeling section. Shells not removed in the upper peeling section are further subjected to pinching action between the large-diameter power rollers and the base idler roller in each channel of the lower peeling section.

The power rollers and the channel-forming rollers are typically constructed of a metal tube or pipe having a rubber coating. Integral with an end of each roller is a gear mounted on a stub shaft. The stub shafts are supported by bearings in the rear wall of the peeler. A suitable drive mechanism is described in U.S. Pat. No. 3,626,551, Dec. 14, 1971, to J. M. Lapeyre. The mechanism includes a gear rack that meshes with the teeth of the gears of the power and channel-forming rollers. A drive motor, through linkages including a pitman arm and cranks, rotates a bull gear that causes the rack to reciprocate back and forth and the engaged rollers to oscillate in alternating rotational directions.

With use, the rubber coating on the power and channel-forming rollers wears off and the rollers have to be replaced. Because the gear is integral with each roller, it must be disengaged from the rack when the roller is removed. More critically, when a new or refurbished roller is installed in the peeler, the roller must be positioned carefully to make sure that its gear meshes precisely with the rack to avoid backlash and other undesirable properties caused by sloppy gear meshing. Aligning the rollers and meshing their gears properly take a lot of trial and error, making roller replacement a time-consuming task.

Another problem is that the portion of the rack gear that meshes with the bull gear is subject to greater wear than the other portions of the rack gear. So the portion that meshes with the bull gear is a separate insert made of a tough bronze alloy rather than brass like the rest of the rack. Once the rack gear is in place in a peeler, it is difficult to separate the bronze alloy portion of the rack from the brass portion when the rack insert has to be replaced.

SUMMARY

One version of a peeling apparatus embodying features of the invention comprises peeling rollers that extend in parallel to form peeling channels between adjacent peeling rollers. Each of the peeling rollers has a roller gear at a first end. A rack assembly includes a rack gear that engages the roller gears. A jack attached to the rack assembly moves the rack gear between a first position in which the rack gear is engaged with the roller gears and a second position in which the rack gear is disengaged from the roller gears.

Another version of a peeling apparatus embodying features of the invention comprises an end wall having a plurality of slots. Each of the slots extends from a lower end to an upper end. Peeling rollers are supported for rotation and extend in parallel from the end wall to form peeling channels between adjacent peeling rollers. Each of the peeling rollers has a roller gear near a first end. A rack assembly includes a rack gear that engages the roller gears and a slide assembly, which has a stationary element connected to the end wall and a sliding element connected to the rack gear. Bolts extend through the slots and into the stationary element of the slide assembly. The rack gear is engaged with the roller gears when the bolts rest in the lower ends of the slots and is disengaged from the roller gears when the bolts rest in the upper ends of the slots.

Yet another version of a peeling apparatus embodying features of the invention comprises an end wall having through slots and through holes. Peeling rollers are rotatably supported at a first end and extend in parallel from the end wall to form peeling channels between adjacent peeling rollers. Each of the peeling rollers has a roller gear near the end wall. A rack assembly includes a rack gear that can engage the roller gears and a slide assembly slidably coupling the rack gear to the end wall. Bolts extend through the through slots and the through holes into the slide assembly. The slots each include a ramp between upper and lower ends so that, when the bolts through the through holes are removed and the bolts through the through slots are loosened, the rack gears can be moved from engagement with the roller gears to disengagement from the roller gears by sliding the loosened bolts along the ramp from the lower ends to the upper ends of the through slots.

In another aspect of the invention, a method is provided for servicing a peeling apparatus having peeling rollers with pinion gears at one end engaged by a rack gear. The method comprises: (a) loosening bolts retaining a rack gear to an end wall of a peeling apparatus; (b) lifting the rack gear radially away from pinion gears at the ends of peeling rollers by sliding the bolts along slots in the end wall from lower home positions to upper service positions; and (c) inserting a pin through the end wall and into the rack gear to prevent the rack gear from moving when the bolts are in the service position

DETAILED DESCRIPTION

Figure 1:
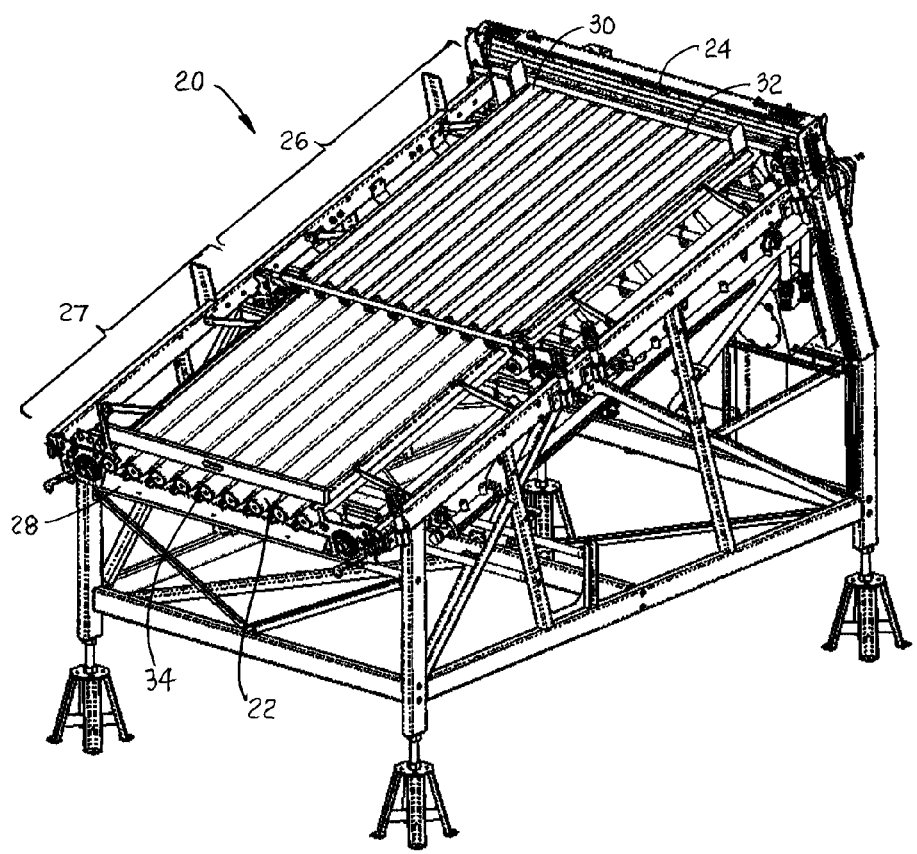
FIG. 1 is an isometric view of peeling apparatus embodying features of the invention with the finger frame removed to simplify the drawing.

A partly disassembled bulk peeler embodying features of the invention is shown in FIG. 1. The peeler 20 has a set of power rollers 22 that extend from an upper end wall or supporting plate 24 through an upper peeling section 26 and a lower peeling section 27 to a lower exit end 28. Channel-forming rollers 30 flanking and spaced slightly above the power rollers 22 in the upper peeling section 26 form peeling channels with the power rollers. Narrow insert rollers 32 are nestled between the power rollers 22 and the channel-forming rollers 30. The lower section 27 lacks the channel-forming rollers 30 and the insert rollers 32. The power rollers 22 are supported on lower idler rollers 34 in the lower peeling section 27. All the rollers 22, 30, 32, 34 are parallel to each other. The term "peeler rollers" is used in this description and in the claims to refer generically to power rollers 22 and to channel-forming rollers 30.

Figure 2A:
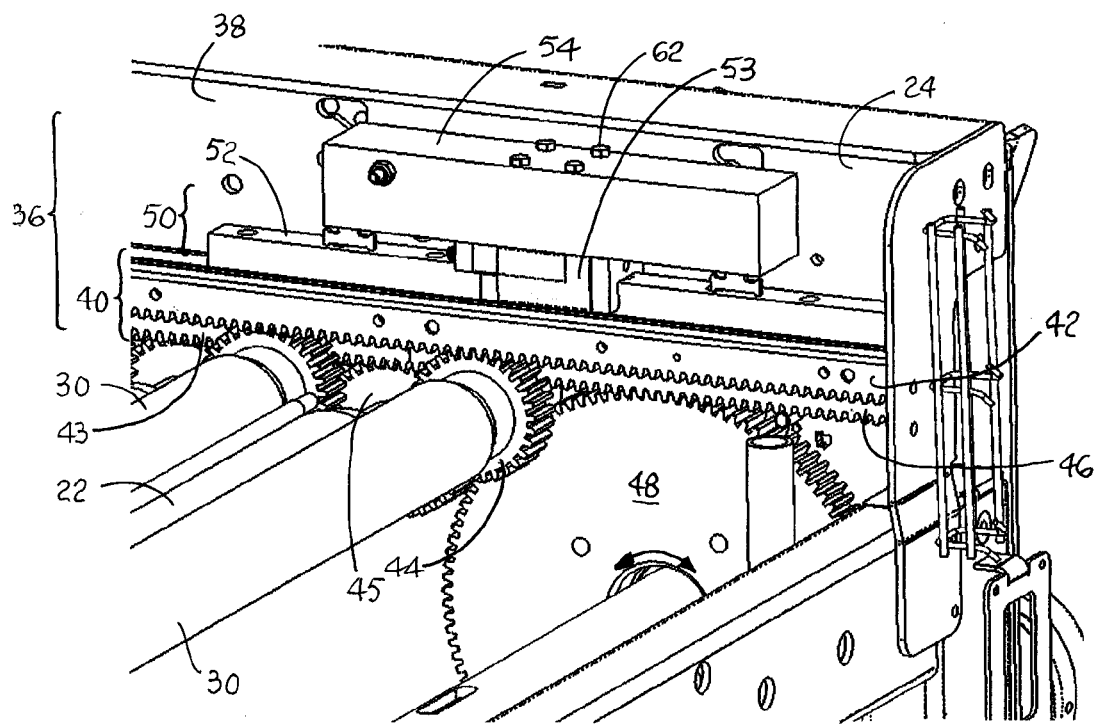
FIGS. 2A and 2B are enlarged views of a front portion of the end wall of the peeling apparatus of FIG. 1 showing a rack gear engaged with and disengaged from roller gears and a drive gear.

FIG. 2A shows a portion of a rack assembly 36 slidably attached to the inner side 38 of the end wall 24. The rack assembly includes a rack gear 40 with two rows 42, 43 of teeth. The first row 42 of teeth engages pinion gears 44 at the ends of the channel-forming rollers 30. The second row 43 of teeth engages pinion gears 45 at the ends of the power rollers 22. Aligned with the second row of teeth is an insert rack gear portion, or rack insert, 46, whose teeth engage a main pinion gear 48 that drives the entire rack gear back and forth along its axis. The main gear 48 is coupled to a drive motor through linkages and cranks that together constitute a rack-gear drive. The back-and-forth translation of the rack gear 40 causes the peeling rollers 22, 30 to rotate back and forth by engagement with the roller gears 44, 45.

Figure 3:
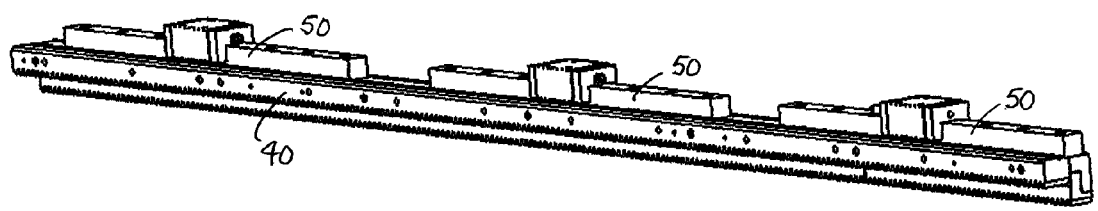
FIG. 3 is axonometric view of a rack gear and a slide assembly usable in peeling apparatus as in FIG. 1.

The rack assembly 36 also includes a slide assembly 50. The slide assembly includes a slide rail 52 firmly attached to the rack gear 40 and a slide block 53 connected stationarily to the end wall 24 via a mounting block 54. The slide assembly 50, including the slide block 53 and the slide rail 52, may be realized as a linear motion guide, such as one of those sold by THK Co., Ltd. of Tokyo, Japan. The rack gear 40 shown in FIG. 3 has three slide assemblies 50 spaced apart along the length of the rack gear for stability. The slide rails 52 slide in their slide blocks 53, which are stationary elements because of their affixation to the end wall 24. A separate mounting block 54 is used because it can be made with precisely located holes for attachment to a jack more easily and inexpensively than having the holes formed in a commercially available standard part. But if the slide block were larger and capable of being precisely machined, the mounting block could be eliminated.

Figure 4A:
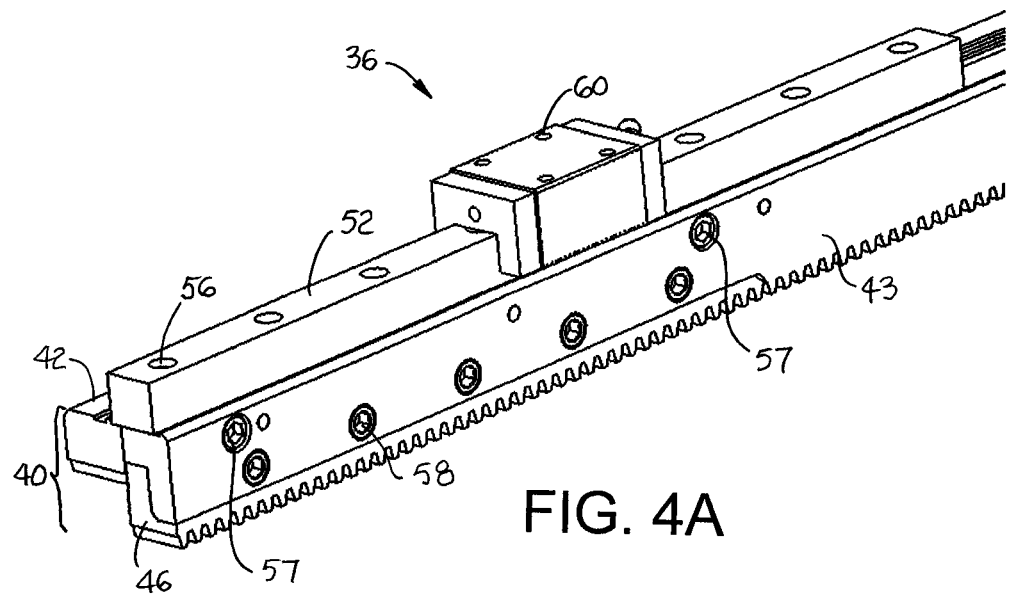
FIGS. 4A and 4B are enlarged rear and front axonometric views of the insert gear portion of the rack gear and slide assembly of FIG. 3.
Figure 4B:
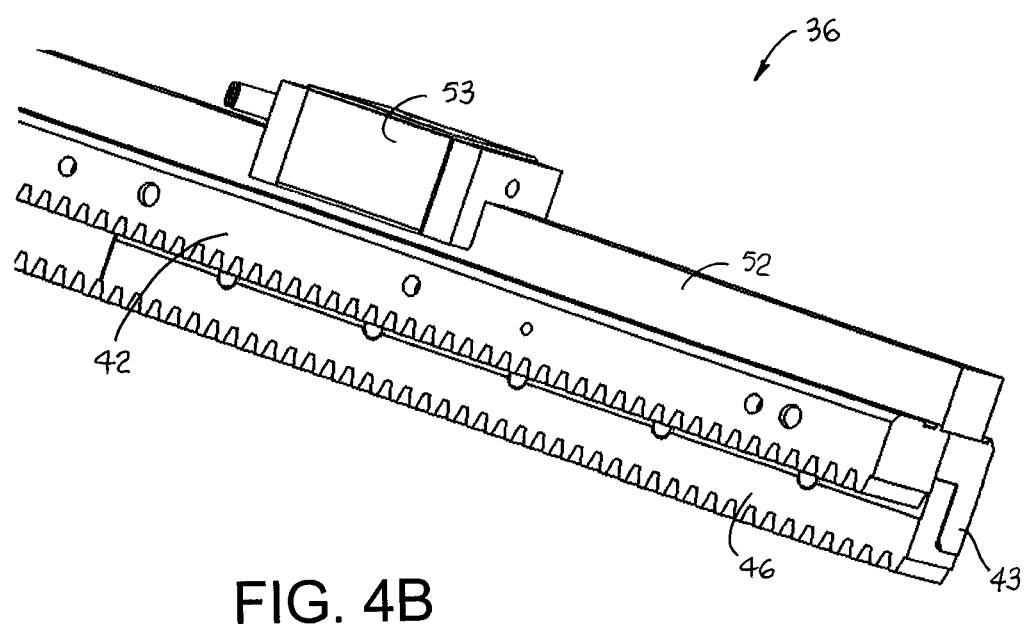

Further details of the end portion of the rack assembly are shown in FIGS. 4A and 4B. Screws or bolts 56 through the slide rail 52 fasten it to the rack gear 40. Socket-head bolts 57 retain the first rack 42 to the second rack 43. Five socket-head bolts 58 fasten the rack insert 46 to the second rack 43. The slide block 53 has four threaded holes 60 in its top face to receive four bolts 62 (FIG. 2A) that affix the slide block to the mounting block 54. The slide block 53 has a grease nipple 64 for greasing internal ball bearings between the slide block and the slide rail 52.

Figure 5A:
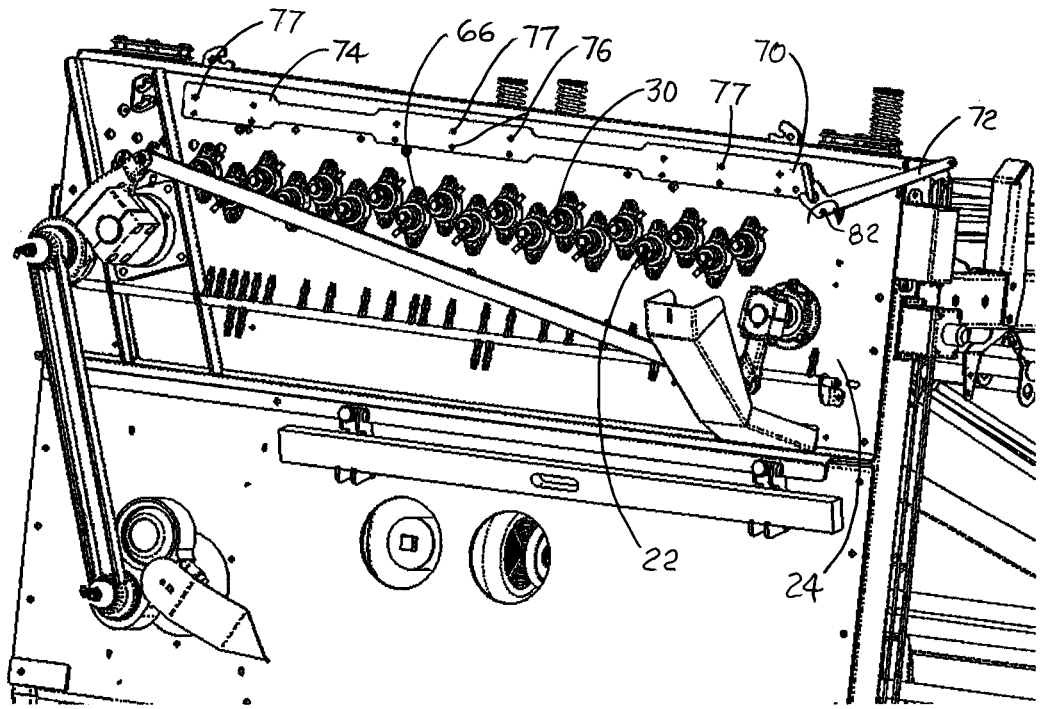
FIGS. 5A and 5B are axonometric views of the rear of the end wall of the peeling apparatus of FIG. 1, showing a rack jack in rack-lowered and rack-raised positions.
Figure 7:
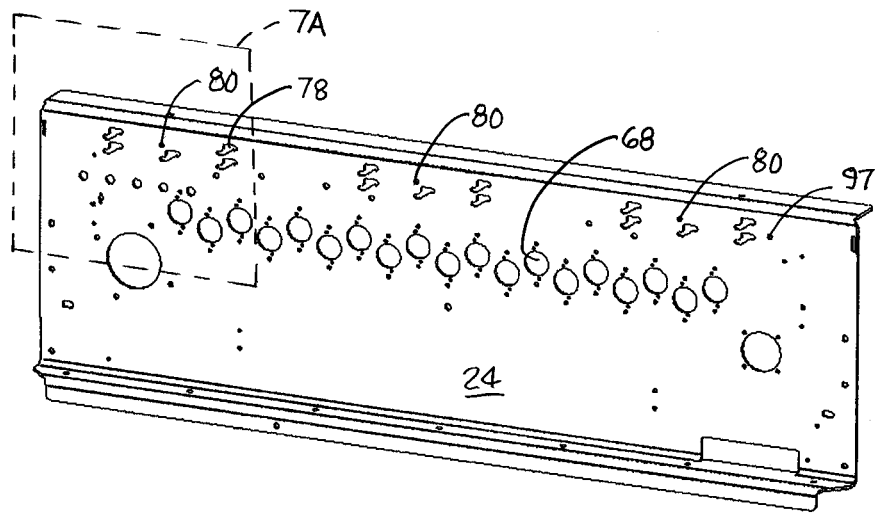
FIG. 7 is an axonometric rear view of the end wall of peeling apparatus as in FIG. 1 showing a hole and slot pattern.

As shown in FIG. 5A, the peeler rollers 22, 30 are rotatably supported in the end wall 24 in bearings 66. The roller bearings 66 are piloted in pilot mounting holes 68 in the end wall 24, as shown in FIG. 7. The diameters of the mounting holes 68 are slightly greater than the outside diameters of the bearings to stabilize the ends of the peeling rollers 22, 30 and maintain the geometry of the peeling channels within a tight tolerance.

Figure 2B:
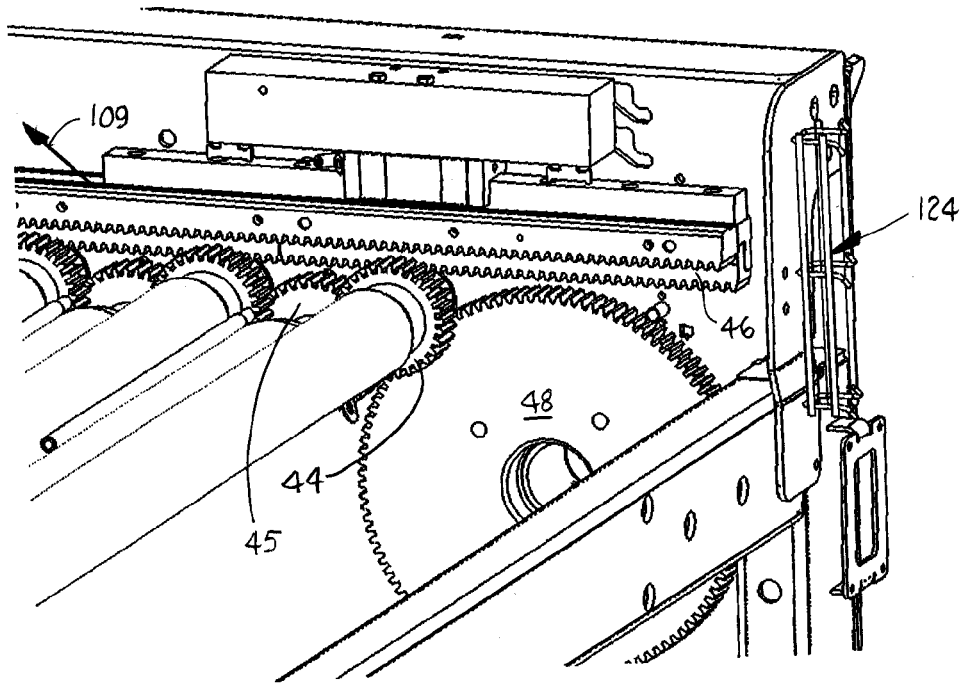

When it becomes necessary to replace one or more peeler rollers 22, 30 or the insert rack gear 46, the rack assembly 36 is lifted into the raised position as in FIG. 2B from the lowered, engaged position shown in FIG. 2A. In this way the teeth of the roller gears 44, 45 disengage from the teeth of the rack gear 40. When the rack gear is lifted into the disengaged position shown in FIG. 2B, the rack insert 46 also disengages the main gear 48. When servicing is complete and the peeler rollers 22, 30 or the insert gear 46 is replaced, the rack assembly 36 is lowered so that the roller gears 44, 45 engage the rack gear 40 as in FIG. 2A.

Figure 5B:
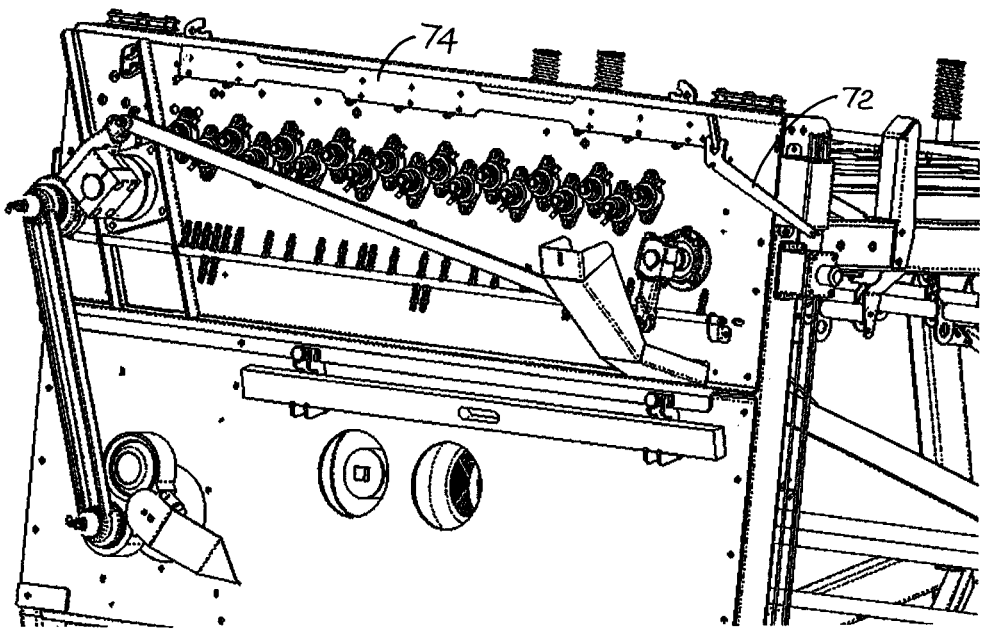

A jack is used to lift the rack assembly 36. As shown in FIG. 5A, the jack 70 includes a handle 72, a link doubler plate 74, and mounting bolts 76. The doubler 74 backs jack slots 78 (best shown in FIGS. 7 and 7A) formed in the end wall 24. The bolts 76 extends through the doubler 74 and the through slots 78 and into threaded holes in the rear faces of the mounting blocks 54 (FIG. 2A). Other bolts 77 extend through the doubler 74 and through round through holes 80 in the end wall 24. When the rack assembly 36 is lowered into its operating position engaged with the roller gears 44, 45 and the main gear 48, the bolts 76, 77 are tightened. To jack the rack assembly 36 to the raised position, the bolts 77 through the round through holes 80 are removed from the mounting block 54 and the doubler 74, and the mounting bolts 76 through the through slots 78 are loosened. The handle 72 is then pivoted down about a pivot pin 82 to the position shown in FIG. 5B. The downward pivoting of the handle 72 translates the doubler 74, the loosened bolt 76, and the rack assembly 36 from the lowered, engaged position shown in FIG. 5A to the raised, disengaged position shown in FIG. 5B.

Figure 6A:
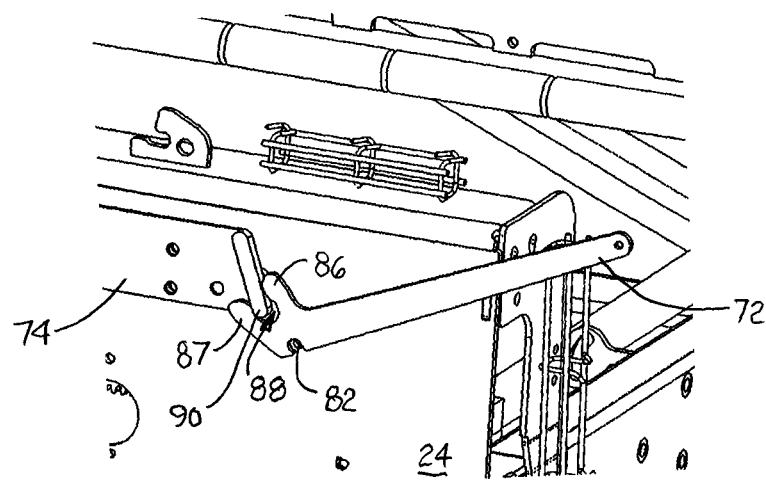
FIGS. 6A and 6B are enlarged views of the handle portion of the jack of FIGS. 5A and 5B.
Figure 6B:
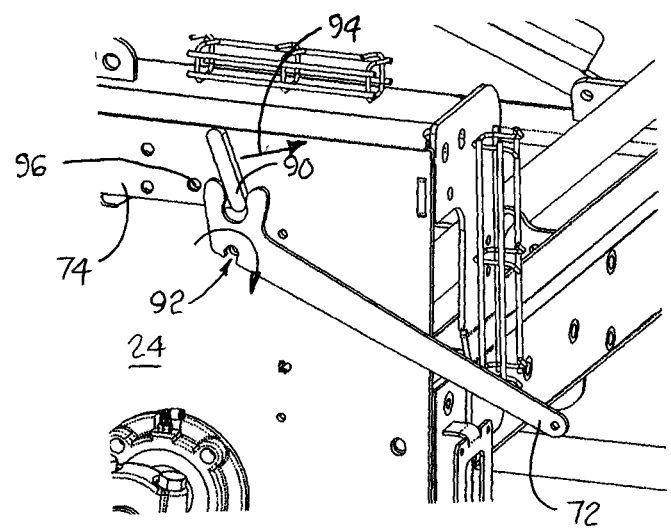

The handle 72, which is shown in more detail in FIGS. 6A and 6B, has a lever arm 84 that terminates in two fingers 86, 87 separated across a gap 88. A protrusion 90 at the end of the doubler plate 54 is received in the gap 88 between the two fingers 86, 87. The pivot pin 82 extending from the end plate 24 into a slot 92 in the handle 72 acts as a fulcrum about which the handle pivots. As the fingers pivot upward in going from the position in FIG. 6A to the position in FIG. 6B, the handle 72 translates the doubler 74 along the end wall 24 in the direction indicated by arrow 94—upward and toward the right in FIG. 6B. That direction of movement disengages the rack gear 40 from the roller gears 44, 45 and the main gear 48. Thus, the doubler 74 serves as a link member imparting movement from the handle to the rack gear 40. One of the removed bolts 77 or a separate pin is inserted into a hole 96 in the doubler 74 and into an aligned hole 97 in the end-wall plate 24 (FIG. 7) to serve as a lock pin holding the rack assembly 26 locked in its raised, disengaged position for safe servicing.

Figure 7A:
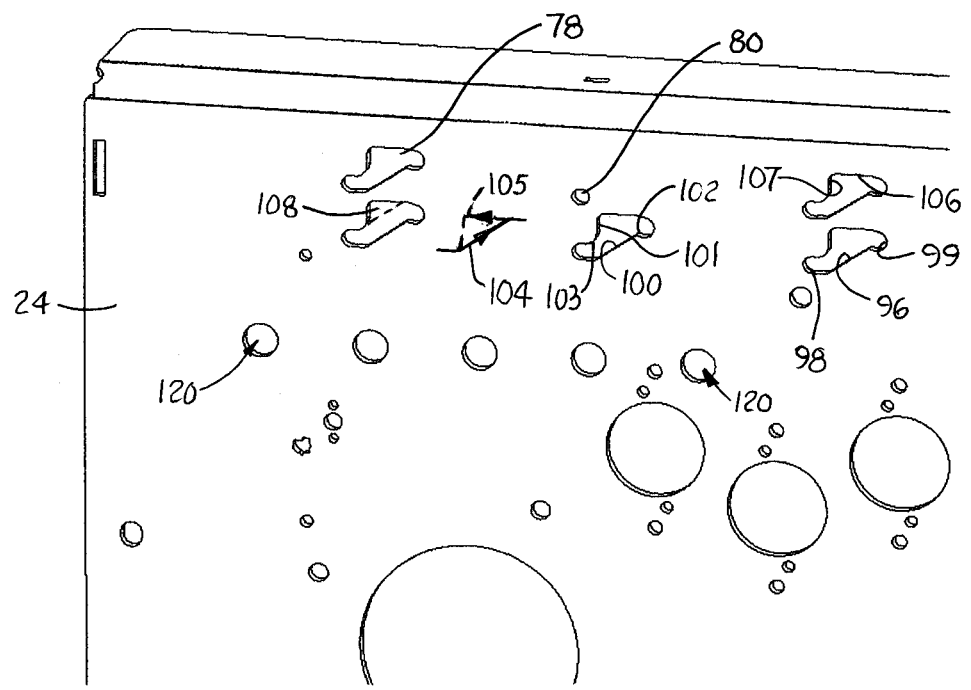
FIG. 7A is an enlarged view of a portion of the end wall of FIG. 7.

The path the rack assembly 36 follows when being disengaged from and re-engaged with the roller gears 44, 45 is determined by the shape of the slots 78 formed in the end wall 24 as shown in detail in FIG. 7A. Each slot 78 has a ramp portion 96 inclined from a lower end 98 to an upper end 99 of the slot. The bolts 76 ride in the slots 78 as the jack is operated. When the rack assembly 36 is being raised, the jack pulls the bolts 76 from their home positions at the lower ends 98 of the slots 78 and slides them up the ramp 96 and into the raised positions at the upper ends 99. The weight of the rack assembly 36 and the doubler plate 74 hold the bolts 76 down against the lower surfaces 100, including the ramps 96, of the slots 78. A bump 102 at the junction of each ramp's upper end and the upper end 99 of each slot forms a detent for the bolt 76 at the upper end of the slot 78. The bump 102 also provides tactile and audible feedback to a jack operator as the bolt rides over the bump 102 and falls into the raised position at the upper end 99 of the slot 78. Thus, the ramps 96 guide the bolts 76 along a fixed path 104 as the rack assembly 26 is raised, lifting the rack gear 40 radially away from the roller pinion gears 44, 45 along a unique path 109 (FIG. 2B) oblique to the axial length of the rack.

Each slot 78 has an upper surface 101 opposite its lower surface 100. The upper surface 101 has a horizontal portion 106 extending from the upper end 99 of the slot 78 and a vertical portion 107 extending from the lower end 98 to the horizontal surface. Thus, the slots 78 are wider opposite the ramp 100 than at the ends 98, 99. The wider spacing provides headroom 108 for the bolts 76 so that they can follow a different path 105 as the jack lowers the rack gears 40 into engagement with the roller gears 44, 45. Because the roller gears 44, 45 are not guaranteed to all be in phase when the rack gear is lowered into the service position, the teeth of the rack gear 40 may not mesh readily with the teeth of the roller gears. The headroom 108 furnished by the slot 78 provides play for the operator to jiggle the jack handle 72 back and forth along the horizontal surface between the upper end 99 and the vertical surface 101 until the teeth of the rack gear 40 mesh with the teeth of the roller gears 44, 45. A second bump 103 at the junction of the vertical slot surface 101 and the lower end 98 of the slot provides a detent for the bolts 76 at the engaged home position. Thus, the doubler plate 74, the handle 72, the bolts 76, and the slots 78 in the end wall 24 form the jack.

Figure 8:
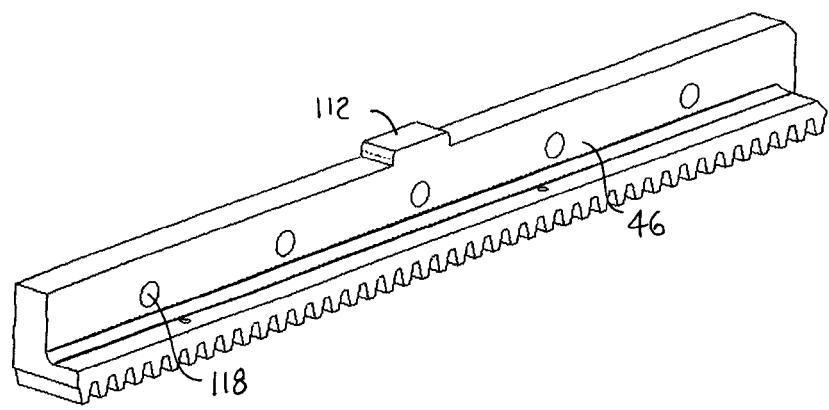
FIG. 8 is an axonometric view of a rack insert rack gear portion for the rack gear of FIG. 3.
Figure 9:
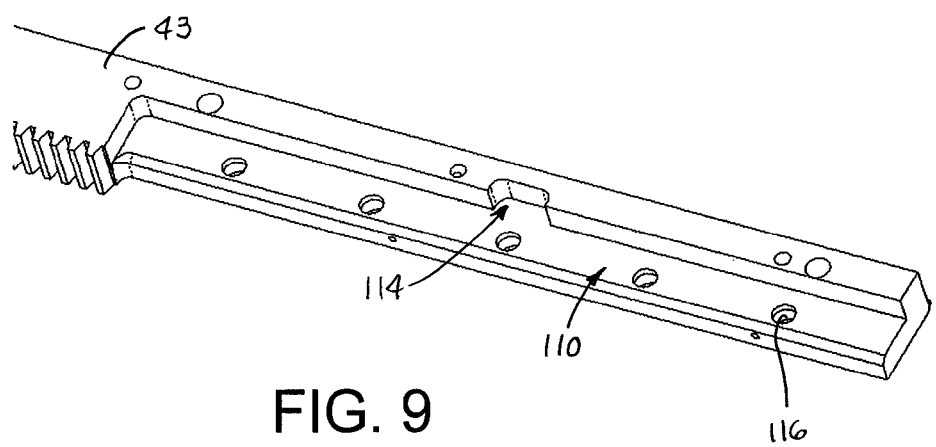
FIG. 9 is an axonometric view of an end portion of the rack gear of FIG. 3 showing a recess for the rack insert of FIGS. 8.
Figure 10:
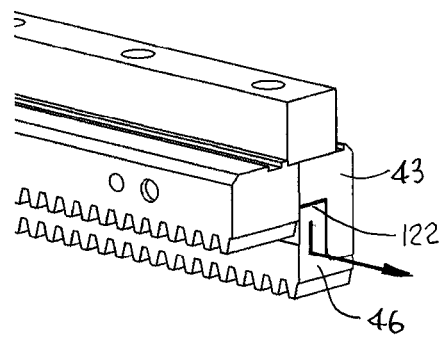
FIG. 10 is an enlarged view of the rack gear of FIG. 3 showing a prying feature for removing the rack insert from the rack gear.

When the jack has raised the rack assembly 36 into the disengaged position and the locking pin is in place in the doubler hole 96 and the end wall's lock hole 97, the rollers 22, 30 can be removed from their bearings 66 and replaced. And if replacement of the rack insert 46 is indicated, it can be removed as well. As shown in FIGS. 8 and 9, the insert gear 46 mounts in a recess 110 at one end of the lower rack gear 43. A tang 112 on the insert gear 46 registers in a pocket 114 in the lower rack 43. The heads of the five socket-head bolts 58 (FIG. 4A) are countersunk into the rear of the lower rack 43 and extend through through holes 116 into threaded holes 118 in the rack insert 46. The five bolts 58 align with five openings 120 (FIG. 7A) in the end wall 24 when the rack assembly 36 is in its locked, disengaged position. In this way the rack insert 46 can be removed from the lower rack 43. A slit 122 formed by beveling the end of the rack insert 46 or the lower rack 43 allows a pry tool, such as a flat-blade screwdriver, to be used to pry the rack insert from the rack as shown in FIG. 10 and out through an opening 124 in the side of the peeler, as shown in FIG. 2B.

If the holes through the end wall 24 (FIG. 7) are precisely located and cut, such as by a laser press, the rollers 22, 30 can be supported in piloted bearings with little end play, the raising and lowering of the rack assembly along the slots will be smooth, and the removal and replacement of the rollers and the gear insert will be easy.

The term "bolt" is used in the description and claims as a generic term for fasteners that connect the rack assembly to the jack. Screws, rods, pins, stubs, and dowels are examples of other such fasteners that the term "bolt" is meant to include.

What is claimed is:

1. A peeling apparatus comprising:
   a plurality of peeling rollers extending in parallel to form peeling channels between adjacent peeling rollers, wherein each of the peeling rollers has a roller gear at a first end of the roller;
   a rack assembly including a rack gear engageable with the roller gears;
   a jack attached to the rack assembly to move the rack gear between a first position in which the rack gear is engaged with the roller gears and a second position in which the rack gear is disengaged from the roller gears.

2. A peeling apparatus as in claim 1 further comprising a drive coupled to the rack assembly to translate the rack gear to rotate the peeling rollers when the rack gear is engaged with the roller gears, wherein the drive includes a main gear and wherein the rack assembly includes an insert gear portion that engages the main gear when the rack gear is in the first position and that is disengaged from the main gear when the rack gear is in the second position.

3. A peeling apparatus as in claim 2 wherein the insert gear portion is removable from the rack assembly when the rack gear is in the second position.

4. A peeling apparatus as in claim 2 wherein the rack gear includes a recess for receiving the insert gear portion and wherein a slit is formed between the insert gear portion and the rack gear to allow access to a pry tool to separate the insert gear portion from the rack gear when the rack gear is in the second position.

5. A peeling apparatus as in claim 1 comprising:
   a support plate having an outer side and an inner side and a plurality of slots extending from the outer side to the inner side;

a doubler backing the slots at the outer side of the support plate;

a plurality of mounting bolts extending from the doubler through the slots and into the rack assembly at the inner side of the support plate;

wherein the slots form ramps that incline from lower to upper ends of the slots along which the mounting bolts, when loosened, slide as the rack gear is moved by the jack from the first position to the second position.

6. A peeling apparatus as in claim 5 wherein the support plate includes bumps at the upper ends of the ramps to form detents for the mounting bolts at the upper ends of the slots.

7. A peeling apparatus as in claim 5 wherein the slots are wider opposite the ramps than at the upper and lower ends of the slots.

8. A peeling apparatus as in claim 5 wherein the rack assembly includes a slide rail, a slide block that is slidable relative to the slide rail, and a mounting block attached to the slide block, wherein the mounting block receives the mounting bolts from the doubler.

9. A peeling apparatus as in claim 1 wherein the jack includes bolts residing in slots defined by lower surfaces that guide the bolts and the rack gear along a first path from the first position to the second position and by upper surfaces spaced apart from the lower surfaces to provide enough room for the bolts and the rack gear to follow a second path different from the first path in going from the second position back to the first position.

10. A peeling apparatus as in claim 1 wherein the rack assembly includes a slide rail and a plurality of blocks slidably coupled to the slide rail, wherein the jack is connected to the plurality of blocks.

11. A peeling apparatus as in claim 1 wherein the jack further includes a pivotable lever handle for manually moving the rack gear between the first and second positions.

12. A peeling apparatus as in claim 1 wherein the jack moves the rack gear from the first position to the second position along a first path generally oblique to the length of the rack gear and back from the second position to the first position along a second path that is the same as or different from the first path.

13. A peeling apparatus comprising:

an end wall having a plurality of slots, each of the slots extending from a lower end to an upper end;

a plurality of peeling rollers supported for rotation and extending in parallel from the end wall to form peeling channels between adjacent peeling rollers, wherein each of the peeling rollers has a roller gear near a first end of the roller;

a rack assembly including:

a rack gear engageable with the roller gears;

a slide assembly having a stationary element connected to the end wall and a sliding element connected to the rack gear;

a plurality of bolts extending through the slots and into the stationary element of the slide assembly;

wherein the rack gear is engaged with the roller gears when the bolts rest in the lower ends of the slots and is disengaged from the roller gears when the bolts rest in the upper ends of the slots.

14. A peeling apparatus as in claim 13 further comprising a link member from which the plurality of bolts extend through the slots and into the stationary element so that, when the plurality of bolts are loosened, the link member can move the plurality of bolts along the slots between the lower and upper ends to selectively engage and disengage the rack gear from the roller gears.

15. A peeling apparatus as in claim 14 further comprising a lock holding the rack gear in the second position and preventing the jack from operating for safe servicing of the peeling rollers.

16. A peeling apparatus comprising:

an end wall having a plurality of through slots and a plurality of through holes;

a plurality of peeling rollers rotatably supported at a first end and extending in parallel from the end wall to form peeling channels between adjacent peeling rollers, wherein each of the peeling rollers has a roller gear near the end wall;

a rack assembly including:

a rack gear engageable with the roller gears;

a slide assembly slidably coupling the rack gear to the end wall;

a plurality of bolts extending through the through slots and the through holes into the slide assembly;

wherein the slots each include a ramp between upper and lower ends of the slot so that, when the bolts through the through holes are removed and the bolts through the through slots are loosened, the rack gear can be moved from engagement with the roller gears to disengagement from the roller gears by sliding the loosened bolts along the ramp from the lower ends to the upper ends of the through slots.

17. A peeling apparatus as in claim 16 wherein the end wall further includes a plurality of pilot holes and wherein the peeling apparatus further comprises a plurality of bearings, each of the bearings mounted in one of the pilot holes to form piloted bearings.

18. A method for servicing a peeling apparatus having peeling rollers with pinion gears at one end engaged by a rack gear, the method comprising:

loosening bolts retaining a rack gear to an end wall of a peeling apparatus;

lifting the rack gear radially away from pinion gears at the ends of peeling rollers by sliding the bolts along slots in the end wall from lower home positions to upper service positions;

inserting a pin through the end wall and into the rack gear to prevent the rack gear from moving when the bolts are in the service position.

19. The method of claim 18 further comprising:

removing the pin;

lowering the rack gear back into engagement with the roller gears by moving the bolts within the slots from the upper service positions to the lower home positions.

* * * * *